United States Patent
Watanabe et al.

[11] Patent Number: 5,956,965
[45] Date of Patent: Sep. 28, 1999

[54] WATERCOOLER

[75] Inventors: Hideo Watanabe, Kawasaki; Motohiro Sakai, Yokohama, both of Japan

[73] Assignee: Thermovonics Co., Ltd., Kawasaki, Japan

[21] Appl. No.: 08/951,111

[22] Filed: Oct. 15, 1997

[30] Foreign Application Priority Data

Oct. 16, 1996 [JP] Japan .................................. 8-273583

[51] Int. Cl.⁶ .................. C02F 1/04; F24F 3/14
[52] U.S. Cl. .................. 62/389; 62/238.5; 62/506
[58] Field of Search .................. 62/389, 79, 238.5, 62/279, 396, 506

[56] References Cited

U.S. PATENT DOCUMENTS 5,511,388  4/1996  Taylor et al. .................. 62/389

FOREIGN PATENT DOCUMENTS 5-285053  11/1993  Japan .
8-257565  10/1996  Japan .
10-14766   1/1998  Japan .
WO 94/18516  8/1994  WIPO .

*Primary Examiner*—Henry Bennett
*Assistant Examiner*—Melvin Jones
*Attorney, Agent, or Firm*—Evenson, McKeown, Edwards & Lenahan, PLLC

[57] ABSTRACT

A watercooler is provided with a vessel for storing water therein; a heater for boiling the water in the vessel; a pump for lifting the boiled water; a primary cooling unit (e.g., air-cooled heat exchanger tube and a fan) for subjecting to primary cooling the boiled water lifted by the pump; a secondary cooling unit (e.g., the fan, a heat-dissipating-side thermal conductor, a thermoelectric module, a heat-absorbing-side thermal conductor, and a cold water pipe) for subjecting the water, which has been subjected to the primary cooling, to secondary cooling by using the thermoelectric module; and a service unit for dispensing the cold water subsequent to the secondary cooling.

12 Claims, 9 Drawing Sheets

WATERCOOLER

BACKGROUND OF THE INVENTION a) Field of the Invention

This invention relates to a watercooler useful, for example, at home, an office, a store or any other work place, specifically to a watercooler of the type that water is chilled into cold water after once boiling it and a watercooler of the type that water is caused to evaporate, the resulting water vapor is condensed and the condensate is then chilled into cold water.

b) Description of the Related Art

To provide good cold drinking water without chlorine, trihalomethane and the like, active R&D work is under way in recent years on boiling-type watercoolers in which water is chilled into cold water after once boiling it and distillation-type watercoolers in which water is caused to evaporate, the resulting water vapor is condensed and the condensate is then chilled into cold water, leading to a variety of proposals.

FIG. 9 is a schematic construction diagram of a conventional boiling-type watercooler. Water 101 placed in a pot 100 is drawn out by a recirculating pump 102 through a bottom part of the pot 100, is delivered to a cold water/hot water selector valve 103, and is then recirculated selectively either through a cold water pipe 104 or a hot water pipe 105.

The cold water pipe 104 is covered at a portion of its outer periphery by a cooling block 106 made of a thermal conductor such as a metal. A thermoelectric module 107 is arranged with a heat-absorbing side thereof maintained in close contact with the cooling block 106. Heat-dissipating fins 108 are disposed in close contact with a heat-dissipating side of the thermoelectric module 107. A fan 109 is arranged in the vicinity of the heat-dissipating fins 108.

On the other hand, the hot water pipe 105 is covered at a part of its outer periphery by a heating unit 111 equipped with a built-in heater 110.

Underneath the bottom part of the pot 100, a service pipe 113 composed of a glass pipe extends via a service pump 112. This service pipe 113 also serves as a water level gauge which indicates the amount of the water 101 within the pot 100.

When preparing cold water in this boiling-type watercooler, the cold water/hot water selector valve 103 is first switched to a hot water side (as indicated by a dotted arrow), and the recirculating pump 102 is driven so that the water 101 is heated at the heating unit 111 while being fed through the hot water pipe 105. By repeating this recirculation, the temperature of the whole water 101 inside the pot 100 gradually rises and eventually reaches a boiling point, at which boiling is continued for a predetermined time (for example, 5 to 8 minutes). By this boiling, chlorine, trihalomethane and the like which are contained in the water 101 are removed from the inside of the pot 101 by an unillustrated removal unit.

After the boiling has been performed for the predetermined time, the heating unit 111 is deenergized and instead, the thermoelectric module 107 is energized and at the same time, the fan 109 is driven and the cold water/hot water selector valve 103 is switched to a cold water side (as indicated by a solid arrow). By recirculating the boiled water through the cold water pipe 104, the temperature of the boiled water gradually drops owing to the Peltier effect of the thermoelectric module 107. The water 101 eventually becomes cold water of an adequate temperature. Through the service pipe 113 the cold water can then be dispensed in an amount as much as needed.

The boiling-type watercooler is however designed to boil the water 101, which is filled in the pot 100, for the predetermined time while recirculating it and then to chill the water 101 down to a predetermined temperature while recirculating it. It is therefore impossible to dispense cold water until the water 101 has been chilled into cold water in its entirety. Obviously, a long time is needed until cold water becomes available. The boiling-type watercooler is therefore not suited where one wants to obtain cold water promptly.

Further, upon switching the cold water/hot water selector valve 103 to the cold water side and recirculating boiled water through the cold water pipe 104, a large thermal load is suddenly applied to the thermoelectric module 107. Thermal stress is hence exerted in the thermoelectric module 107, for example, on a solder layer joining heat-absorbing-side electrodes with semiconductor layers and also on a solder layer joining a heat-absorbing-side base with the heat-absorbing-side electrodes, whereby these solder layers may be damaged. As a result, the state of joining between these elements may be deteriorated, possibly leading to a drawback that the thermoelectric module 107 may have a short service life.

SUMMARY OF THE INVENTION

An object of the present invention is therefore to eliminate such drawbacks of the conventional art, thereby providing a watercooler which has a long service life and requires shorter time until cold water is obtained.

To achieve the above-described object, the present invention, in a first aspect thereof, provides a watercooler comprising:

a vessel for storing water therein, for example, a pot surrounded by a heat-insulating layer;

a heater for boiling the water in the vessel;

a pump for lifting the boiled water;

a primary cooling unit for subjecting the boiled water, which has been lifted by the pump, to primary cooling, for example, an air-cooled unit, a watercooled unit or a cooling unit making use of latent heat of vaporization;

a secondary cooling unit for subjecting the water, which has been subjected to the primary cooling, to secondary cooling by using a thermoelectric module, whereby cold water is obtained; and a service unit for dispensing the cold water subsequent to the secondary cooling.

To achieve the above-described object, the present invention, in a second aspect thereof, provides a watercooler comprising:

a vessel for storing water therein, for example, a pot surrounded by a heat-insulating layer;

a heater for boiling the water in the vessel;

a condenser unit for condensing water vapor produced by the boiling, for example, a condenser unit composed of an air-cooled condenser pipe;

a cooling unit for chilling condensed water, which has been obtained from the condenser unit, into cold water by using a thermoelectric module; and a service unit for dispensing the cold water obtained by the cooling unit.

According to the first aspect of the present invention, the water in the vessel is boiled by the heater at a stretch without its recirculation. Boiled water can therefore be obtained efficiently. Further, only a portion of the boiled water is taken out and is then chilled into cold water by the cooling unit. The amount of the boiled water, the temperature of which is to be lowered, is hence small, thereby making it possible to promptly obtain cold water.

Further, the temperature of the boiled water is lowered by the primary cooling unit, and the water is then chilled to an appropriate temperature by the secondary cooling unit making use of the thermoelectric module. Thermal damages to the thermoelectric module are therefore reduced, thereby making it possible to provide the thermoelectric module (watercooler) with substantially-extended service life.

According to the second aspect of the present invention, condensed water—which has been cooled as a primary step in the condensing unit and has been lowered in temperature—is obtained. It is then chilled to an appropriate temperature by the cooling unit making use of the thermoelectric module. Thermal damages to the thermoelectric module are therefore reduced, thereby making it possible to provide the thermoelectric module (watercooler) with substantially-extended service life.

DETAILED DESCRIPTION OF THE INVENTION AND PREFERRED EMBODIMENTS

The specific embodiments of the present invention will next be described with reference to the accompanying drawings.

Figure 1:
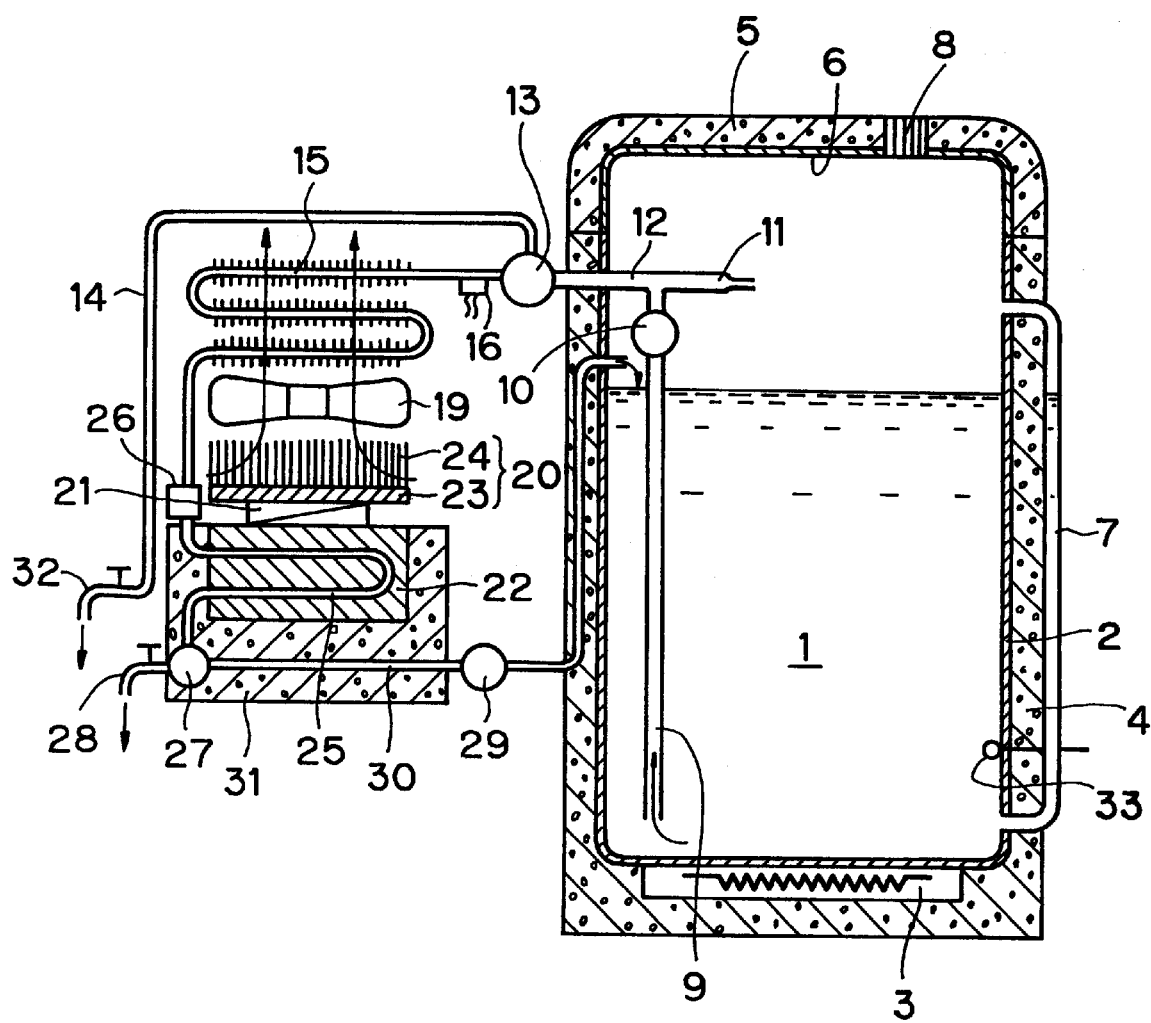
FIG. 1 is a schematic cross-sectional view of a watercooler according to a first embodiment of the present invention.
Figure 2:
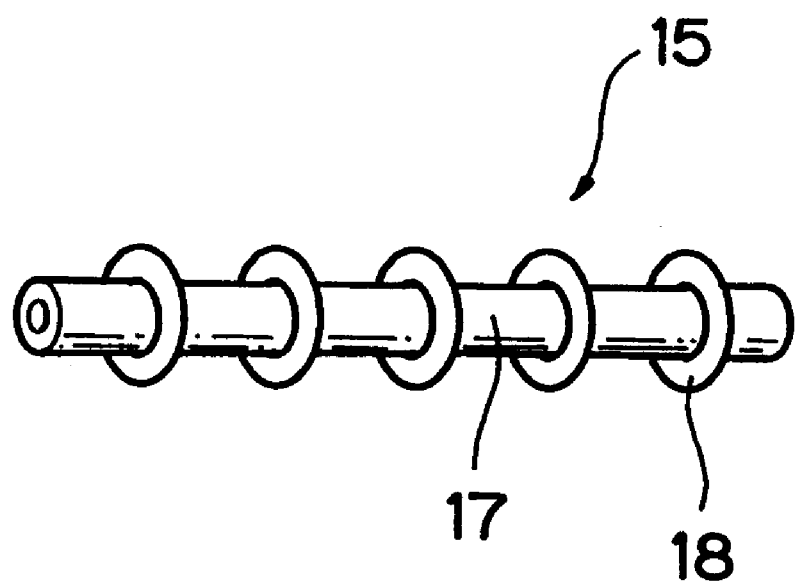
FIG. 2 is a fragmentary perspective view of an air-cooled heat exchanger tube for use in the watercooler, in which the tube is before its machining.
Figure 3:
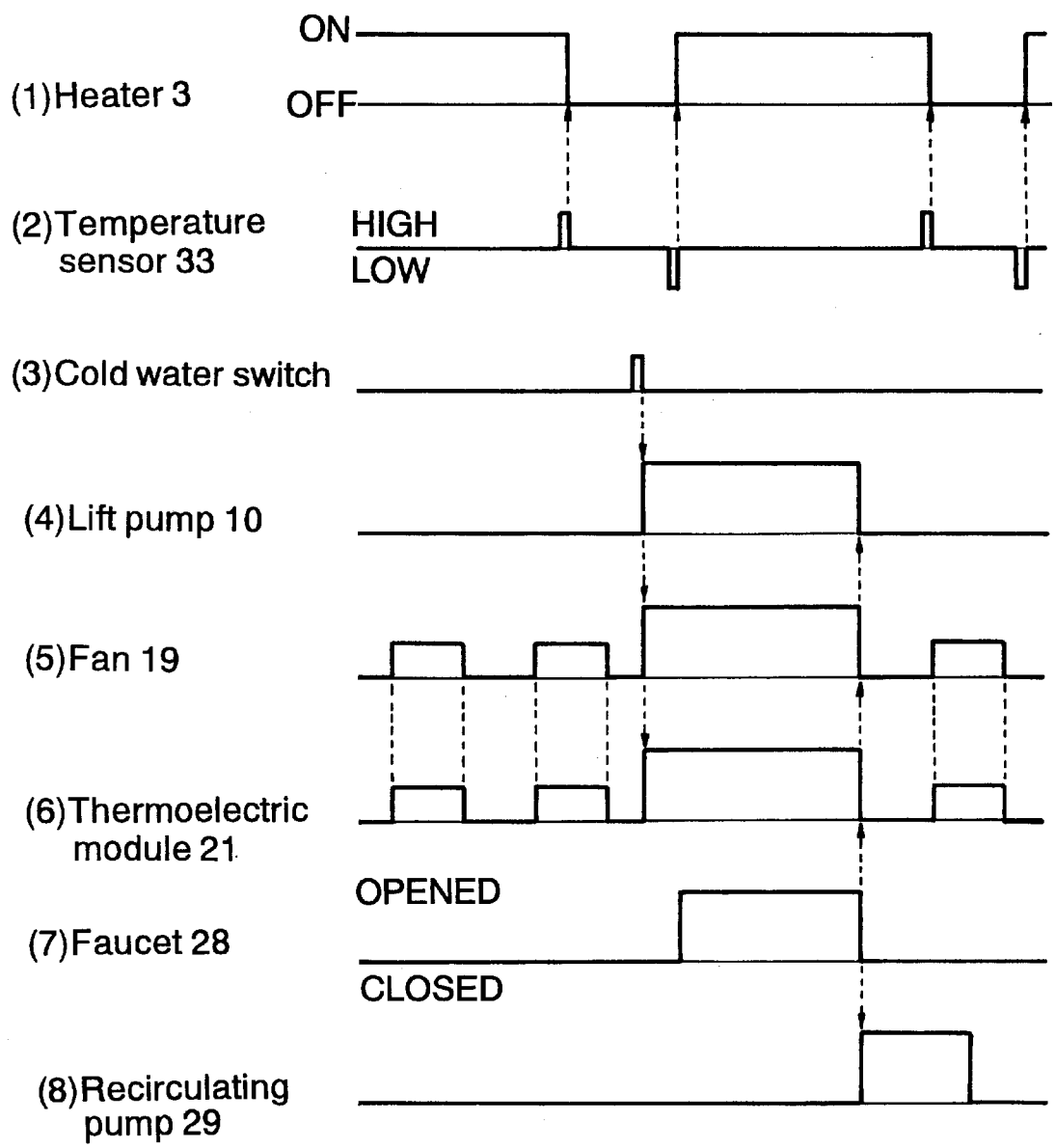
FIG. 3 is a timing chart of various elements upon preparation of cold water in the watercooler.

Referring first to FIGS. 1 through 3, the watercooler according to the first embodiment of the present invention will hereinafter be described.

The watercooler is of the boiling type, and as is illustrated in FIG. 1, a pot 2 in which drinking water 1 (hereinafter simply called "water" for the sake of brevity) is stored is provided on a bottom part thereof with an electric heater 3 the heating capacity of which is changeable over plural levels. The pot 2 is covered at an outer periphery thereof by a heat-insulating layer 4. An upper opening of the pot 2 is closed in an air- and liquid-tight fashion by a lid 6 which is provided with a heat-insulating layer 5. The pot 2 is also provided on an outer peripheral wall thereof with a water level gauge 7 composed of a transparent material such as glass. The lid 6 is also provided with an opening 8 through which toxic substances such as chlorine and trihalomethane are removed during boiling of the water 1.

Within the pot 2, a lift pipe 9 is arranged extending in a vertical direction. A lower end of the lift pipe 9 extends close to the bottom part of the pot 2, whereas an upper end of the lift pipe is located at a position somewhat above a water level when the pot is full, and is connected to a lift pump 10. A pipe 12 with an overflow pipe 11 arranged at an end thereof is connected to the pump 10, and the pipe 12 outwardly extends through a peripheral wall of the pot 2 (heat-insulating layer 4) and is connected to a selector valve 13. The overflow pipe 11 is open at an end thereof toward a space in the pot 2.

Connected to the selector valve 13 are a hot water pipe 14 and an air-cooled heat exchanger tube 15. Although not illustrated in the figure, the hot water pipe 14 is covered by a heat-insulating layer. On a part of the air-cooled heat exchanger tube 15, a flow sensor 16 composed, for example, of a temperature sensor, a pressure sensor or the like is attached to detect flowing of the water 1 through the air-cooled heat exchanger tube 15.

As is shown in FIG. 2, the air-cooled heat exchanger tube 15 is composed of an elongated small-diameter tube 17 and fins 18 arranged on an outer periphery of the tube 17. As the shape of the fins 18, a suitable shape such as a circular shape, a rectangular or square shape or a helical shape can be chosen. This air-cooled heat exchanger tube 15 is bent in a tortuous form over plural stages as depicted in FIG. 1 or is curved in a helical shape, and is connected in a single layer or plural layers.

A fan 19 is arranged underneath the air-cooled heat exchanger tube 15, and below the fan, a heat-dissipating-side thermal conductor 20, a thermoelectric module 21 and a heat-absorbing-side thermal conductor 22 are disposed in a state maintained in close contact in a vertical direction.

The heat-dissipating-side thermal conductor 20 is constructed of a base 23, which is maintained in close contact with the thermoelectric module 21, and a number of heat-dissipating fins 24 arranged extending upright from the base 23 and having a suitable shape such as a plate- or pin-like shape. These heat-dissipating fins 24 are arranged in the proximity of the fan 19.

The thermoelectric module 21 is composed primarily of a heat-dissipating-side substrate arranged on a side of the heat-dissipating-side thermal conductor 20, a heat-absorbing-side substrate arranged on a side of the heat-absorbing-side substrate 22, and a number of P-type semiconductor layers and N-type semiconductor layers interposed between the heat-dissipating-side substrate and the heat-absorbing-side substrate, although not illustrated in the drawings. As the heat-dissipating-side substrate and the heat-absorbing-side substrate, aluminum, ceramic, aluminum nitride or like substrates having electrically insulating films, for example, anodized alumina films or the like formed thereon can be used.

The heat-absorbing-side thermal conductor 22 is formed, for example, of a block made of a metal such as aluminum, copper or a copper alloy. A cold water pipe 25 which extends out from the air-cooled heat exchanger tube 15 is embedded in a tortuous or helical form in the heat-absorbing-side thermal conductor 22. Illustrative embedding methods of the cold water pipe 25 include a method in which the heat-absorbing-side thermal conductor 22 is split into halves and the cold water pipe 25 is held between the halves to embed the cold water pipe 25 in the heat-absorbing-side thermal conductor 22; and a method in which upon casting the heat-absorbing-side thermal conductor 22 made of aluminum or the like, the cold water pipe 25 is cast in the heat-absorbing-side thermal conductor. In this embodiment, a cold reserving layer maintained in a low-temperature state is formed by the metal block of the heat-absorbing-side thermal conductor 22. It is however possible to form the cold reserving layer with a liquid such as water or an antifreeze instead of the metal block.

The revolution speed of the fan 19 can be switched over between two levels depending on whether the watercooler is in a provisional chilling mode or in a main chilling mode. Likewise, the current value for the thermoelectric module 21 can be switched over between two levels depending on whether the watercooler is in the provisional chilling mode or in the main chilling mode. Although the revolution speed and the current value are each changeable between the two levels in this embodiment, the present invention is not limited to such an embodiment. They may each be designed to be adjustable in multiple stages of three or more stages or in a stepless manner.

A filter 26, which is in the form of a cartridge to permit replacement by a fresh one, is arranged at an intermediate position in a line which connects the air-cooled heat exchanger tube 15 and the cold water pipe 25 with each other. The filter 26 is composed, for example, of antibacterial activated carbon, hollow fibers and/or Bakuhanseki (trade name) packed in a single layer or combined in plural layers. It is also possible to incorporate in the filter 26 a substance from which mineral components are dissolved out, such as Bakuhanseki or corallite.

An automatic directional control valve 27 is connected to a free end portion of the cold water pipe 25. Connected to the directional control valve 27 are a cold water facet 28, through which cold water is dispensed, and a recirculating pipe 30 provided at an intermediate part thereof with a recirculating pump 29. The recirculating pipe 30 extends into the pot 2. The heat-absorbing-side thermal conductor 22 and the recirculating pipe 30 are covered by a heat-insulating layer 31.

A hot water facet 32 is connected to a free end of the hot water pipe 14. To detect the temperature of the water 1, a temperature sensor 33 is arranged inside the pot 2.

Incidentally, the watercooler may be made of rubber, a synthetic resin and/or the like at each portion where the water 1 is reserved or is caused to flow. An antibacterially-treated material can be used for such a portion.

Although not illustrated in the drawings, a control panel is placed at an appropriate position, for example, on a side wall of the watercooler. Arranged compactly on the panel are thin-film cold water switch and hot water switch, one of which is pressed when cold water or hot water is desired; an indicator means, such as a lamp or a liquid crystal display, for indicating that the water 1 is in a boiling state (in a ready-to-use state); and a signal means, such as a lamp or a buzzer, for informing that replenishment of the water 1 is needed.

In this embodiment, a primary cooling unit is constructed by the air-cooled heat exchanger tube 15 and the fan 19, and a secondary cooling unit is constructed by the fan 19, the heat-dissipating-side thermal conductor 20, the thermoelectric module 21, the heat-absorbing-side thermal conductor 22 and the cold water pipe 25. The fan 19 is used commonly in both the cooling units.

With reference to FIG. 1 and FIG. 3, a description will next be made about the principle of operation of the boiling-type watercooler.

By energization of the heater 3, the water 1 in the pot 2 is heated and is eventually brought to a boiling point. This is detected by the temperature sensor 33 and after an elapse of a predetermined time, the heater 3 is deenergized by a timer. By performing ON/OFF control of the heater 3 on the basis of a detection by the temperature sensor 33 as described above, the water 1 in the pot 2 is maintained in a boiling state or in a state close to the boiling state. Chlorine, trihalomethane and the like, which are contained in the water 1, are therefore eliminated through an unillustrated filter and the opening 8, whereby the water 1 is purified.

Upon confirmation of the maintenance of the water 1 in a boiling state or in a state close to the boiling state by the temperature sensor 33, in other words, except for a state immediately after a supply of water to the pot 2, the fan 19 and the thermoelectric module 21 are intermittently or continuously energized (intermittently energized in this embodiment), so that the fan 19 is rotated at a low speed and a small current is fed to the thermoelectric module 21. As a consequence, the heat-absorbing-side thermal conductor 22 and the cold water pipe 25 are always cooled, and this cooled state is reserved by the heat-insulating layer 31. Incidentally, heat—which has been transferred to the heat-dissipating-side thermal conductor 20 by the cooling of the heat-absorbing-side thermal conductor 22 and the cold water pipe 25—is allowed to dissipate from the heat-dissipating-side thermal conductor 20 and is then taken out of the watercooler, both owing to rotation of the fan 19.

When the cold water switch or the hot water switch on the control panel is pressed, the lift pump 10 is driven, and the selector valve 13 is automatically switched over so that boiled water flows toward the hot water pipe 14 when the hot water switch is pressed or lifted boiled water flows toward the air-cooled heat exchanger tube 15 when the cold water switch is pressed.

When the hot water switch is pressed, the boiled water can be dispensed in a desired amount from the hot water faucet 32 by way of the hot water pipe 14. When the amount dispensed through the faucet 32 is smaller than the lifted amount, the surplus portion of the boiled water is returned to the pot 2 through the overflow pipe 11. This overflow of the surplus portion of the boiled water takes place likewise when cold water is dispensed.

When the cold water switch is pressed, the selector valve 13 is switched so that the boiled water is caused to flow toward the air-cooled heat exchanger tube 15. This flow is detected by the flow sensor 16. Based on a detection signal from the flow sensor, the fan 19 is rotated at a high speed and a specified large current is fed to the thermoelectric module 21. The cold water pipe 25 is cooled further by the heat-absorbing-side thermal conductor 22, so that the cold water pipe 25 becomes ready to chill water.

The air-cooled heat exchanger tube 15 has a sufficient heat-dissipating area owing to the length of the tube 17 and the additional arrangement of the fins 18. By rotating the fan 19 at the high speed, the temperature of the boiled water flowing through the air-cooled heat exchanger tube 15 is therefore lowered quickly, and the water the temperature of which has been lowered is supplied to the filter 26. Microorganisms, organic substances and fine particles such as rust, which are contained in the water, can be removed by the filtering material, such as antibacterial activated carbon, hollow fibers and/or Bakuhanseki in the filter 26. Further, mineral components such as calcium and magnesium can also be dissolved out in well-balanced proportions into the water from the Bakuhanseki or corallite, whereby good drinking water can be obtained.

The water, which has passed through the filter 26, then flows through the cold water pipe 25 which has been held in a low-temperature state, so that the water is cooled to a preset temperature. Responsive to a detection of opening of the cold water faucet 28, the automatic directional control valve 28 is switched to a discharge side so that the cold water can be dispensed from the faucet 28.

Responsive to a detection of closing of the faucet 28, the automatic directional control valve 27 is switched to a recirculation side and at the same time, the driving of the lift pump 10 is stopped and the recirculating pump 29 is driven, whereby the water still remaining within the overflow pipe 11, the pipe 12, the air-cooled heat exchanger tube 15, the cold pipe 25 and the recirculating pipe 30 are returned to the pot 2 to perform drainage. The recirculating pump 29 is designed to automatically stop when it has been driven for a predetermined time. As drainage is performed at every dispense of cold water as described above, the water line is protected from growth of various bacteria, and therefore remains clean.

In this embodiment, the apparatus is designed to always permit supplying hot water and cold water. When only cold water is needed especially in summer, water is boiled for a predetermined time in the beginning and the heater is then not energized, that is, electricity is not supplied for keeping the water hot. In this manner, the temperature of the hot water gradually drops and the energy required for the preparation of cold water is saved further.

Figure 4:
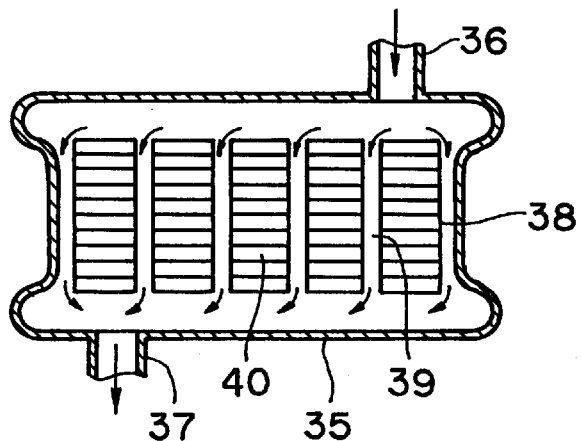
FIG. 4 is a cross-sectional view of a primary cooling unit in a watercooler according to a second embodiment of the present invention.

Referring next to FIG. 4, the primary cooling unit in the watercooler according to the second embodiment will be described. As is shown in the drawing, a casing 35 is provided with an inlet pipe 36 and an outlet pipe 37 at substantially opposite positions. A plurality of corrugated fin blocks 38 bent in a zig-zag form are arranged side by side with channels 39 of a predetermined width interposed therebetween. In each corrugated fin block 38, a number of cooling air flow passages 40 are formed, extending in a vertical direction relative to the drawing sheet. Cooling air sent from the fan is allowed to flow through these passages 40.

The boiled water, which has been lifted from the pot 2, is introduced through the inlet tube 36 of the casing 35 and is allowed to spread and flow through the individual channels 39 as narrow passages. The boiled water is hence efficiently cooled in the corrugated fin block 38, and the water the temperature of which has dropped flows out through the outlet pipe 37 toward the filter 26.

The remaining construction of the watercooler is substantially the same as that of the first embodiment, and its description is omitted herein.

Figure 5:
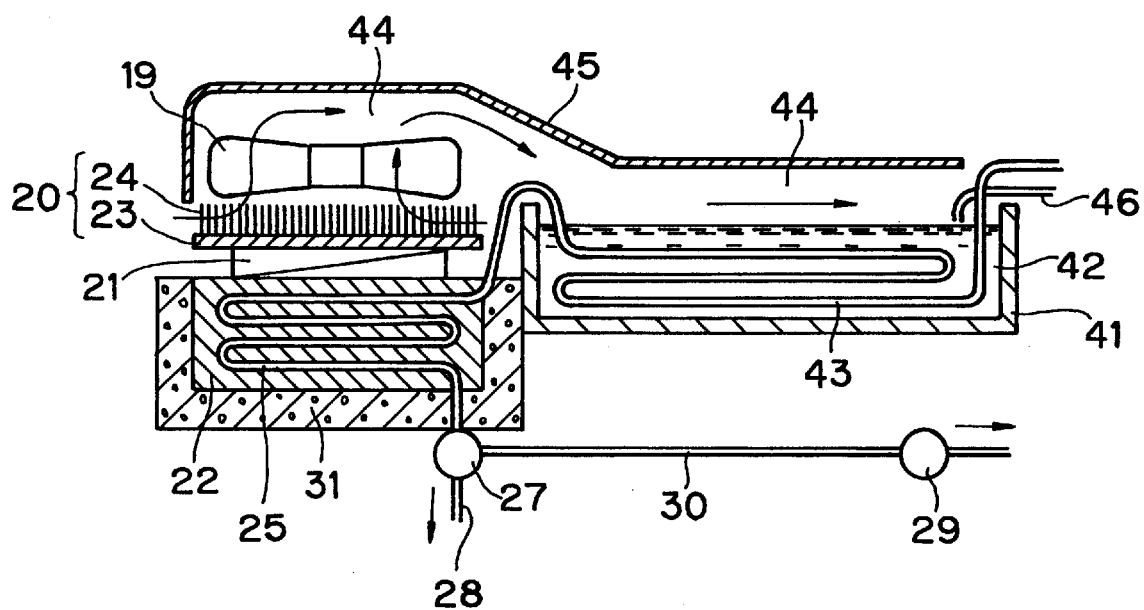
FIG. 5 is a cross-sectional view of a primary cooling unit and its vicinity area in a watercooler according to a third embodiment of the present invention.

With reference to FIG. 5, the primary cooling unit in the watercooler according to the third embodiment will next-be described. In this embodiment, latent heat of vaporization of water is used for the primary cooling unit.

As is shown in the drawing, water 42 is stored in a relatively shallow water tank 41 having a relatively wide area. A heat exchanger tube 43 is submerged there in a tortuously- or helically-bent form. The heat ex-changer tube 43 is connected at an outlet side thereof to a cold water pipe 25. The cold water pipe 25 is embedded in a heat-absorbing-side thermal conductor 22 which acts as a cold reserving layer. Arranged above the heat-absorbing-side thermal conductor 22 are a thermoelectric module 21, a heat-dissipating-side thermal conductor 20 and a fan 19.

Above the fan 19, a duct 45 is disposed with an air flow passage 44 interposed therebetween. A free end of the duct 45 extends to a side of the water tank 41. Wind, which has been produced as a result of rotation of the fan 19, therefore flows through the air flow passage 44 while being guided by the duct 45, that is, flows along a water surface in the water tank 41 as indicated by arrows, whereby vaporization of water 42 is promoted.

Boiled water, which has been lifted from the pot 2 by the lift pump 10 (see FIG. 1), flows through the heat exchanger tube 43, whereby it is cooled first by the water 42 in a bottom part of the water tank 41 and then, cooled further by the water 42 located near the water surface and cooled as a result of a loss of the latent heat of evaporation.

Designated at numeral 46 in the drawing is a water-replenishing pipe. Ordinary water or a portion of the cold water drained by the recirculating pump 29 in FIG. 1 is used as replenishing water. Replenishing of water to the water 42 is automatically performed by detecting the water level in the water tank 41.

In this embodiment, the heat exchanger tube 43 is submerged in the water 42. As an alternative, it is also possible to cool boiled water, which is flowing through the heat exchanger tube 43, by making use of latent heat of vaporization, that is, by covering an outer surface of the heat exchanger tube 43 with a water-holding layer such as a water-holding gel-like substance, fabric or non-woven fabric and blowing air from the fan 19 against the water-holding gel-like substance, fabric or non-woven fabric.

Figure 6:
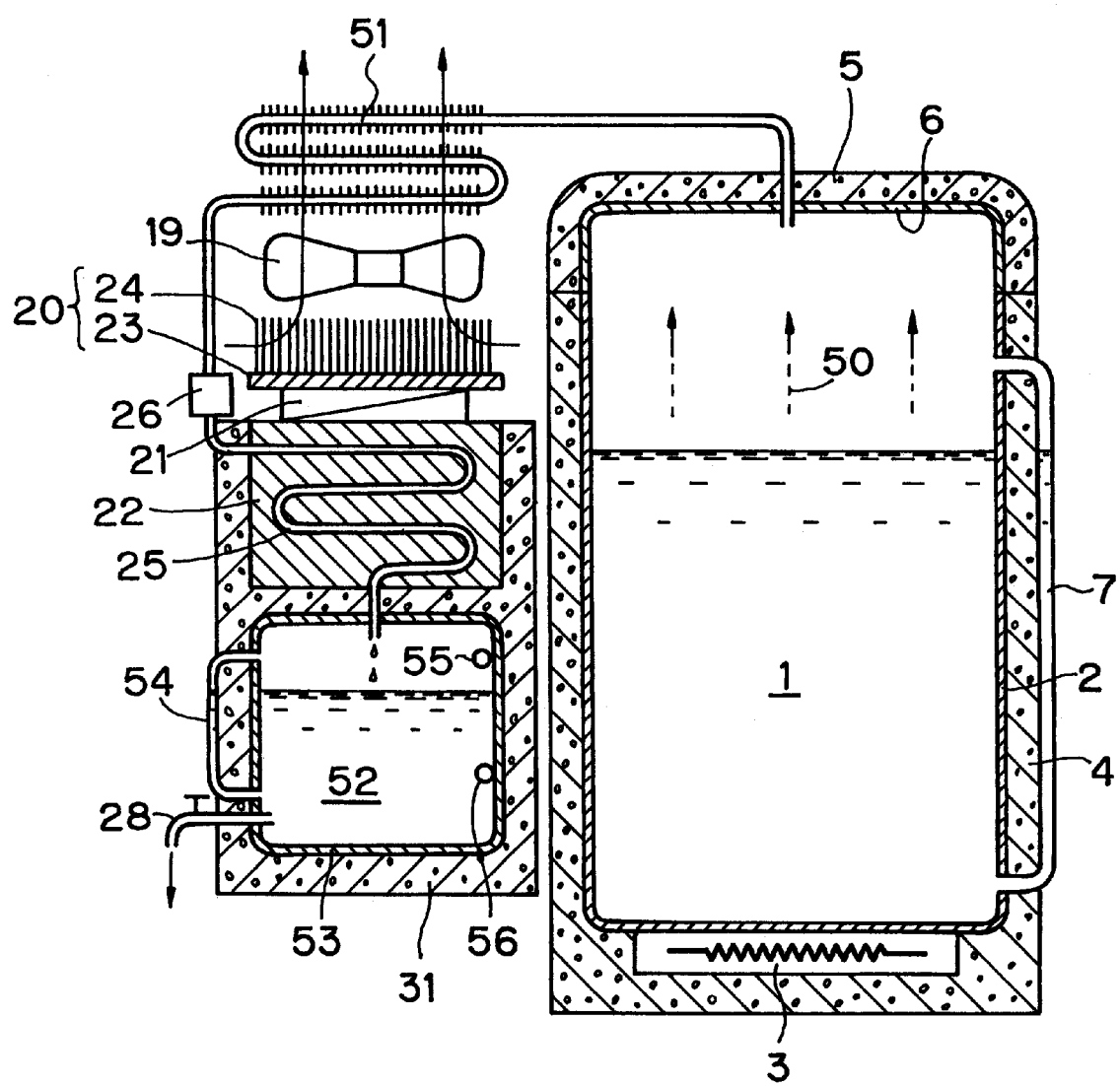
FIG. 6 is a schematic cross-sectional view of a watercooler according to a fourth embodiment of the present invention.

The watercooler according to the fourth embodiment of the present invention will next be described with reference to FIG. 6. This watercooler is of the distillation-type. Water 1 in a pot 2 is heated by a heater 3 and is eventually brought into a boiling state. Water vapor 50 so produced is supplied to a side of a condenser pipe 51. The condenser pipe 51 is provided with a number of fins and is also exposed to air blown upwardly from a fan 19. The water vapor 50 is therefore cooled and condensed into water within the condenser pipe 51. Removal of organic substances and addition of mineral components are conducted in a filter 26. While the water passes through a cold water pipe 25 maintained in a cold reserving state, it turns to cold water 52 and is then successively stored in a cold water reservoir 53. As the cold water reservoir 53 is provided with a cold water faucet 28, a desired amount of cold water can be obtained by opening the faucet 28. The amount of the cold water 52 within the cold water reservoir 53 is indicated by a cold water gauge 54.

As is illustrated in the drawing, a heat-insulating layer 31 is applied over the heat-dissipating-side thermal conductor 22 to the cold water reservoir 53 to maintain the cold reserving state.

To detect the water level inside the cold water reservoir 53, an upper-limit water level sensor 55 and a lower-limit water level sensor 56 are arranged. When the level of the cold water 52 reaches the upper-limit water level sensor 55, the energization of the heater 3 is automatically cut off. When the level of the cold water 52 descends to the lower-limit water level sensor 56, the energization of the heater 3 is automatically resumed to perform the preparation of the cold water 52. Further, the water level inside the pot 2 descends to a preset position, the energization of the heater 3 is automatically cut off and a notification to the effect that water 1 should be replenished is made by the signal means on the control panel.

Figure 7:
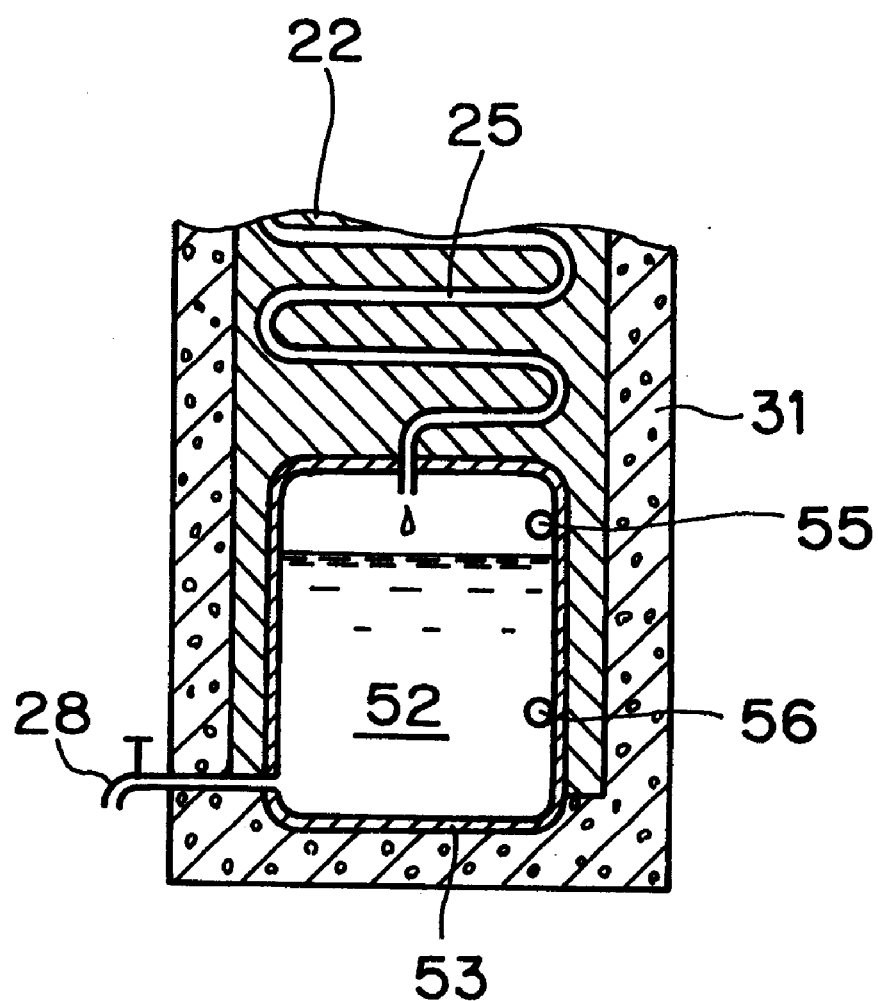
FIG. 7 is a cross-sectional view of a cold water reservoir and its vicinity area in a watercooler according to a fifth embodiment of the present invention.

With reference to FIG. 7, the cold water reservoir of the distillation-type watercooler according to the fifth embodiment of the present invention will be described next. In this embodiment, a part of a heat-absorbing-side thermal conductor 22 made of a metal block is in contact over a wide area with a cold water reservoir 53 (in this embodiment, the cold water reservoir 53 are in area-to-area contact at upper and peripheral walls thereof with the heat-absorbing-side thermal conductor 22) to contribute to the maintenance of the cold water reservoir 53 in a cold state. The remaining construction is the same as that of the above-described fourth embodiment, and its description is omitted herein.

Figure 8:
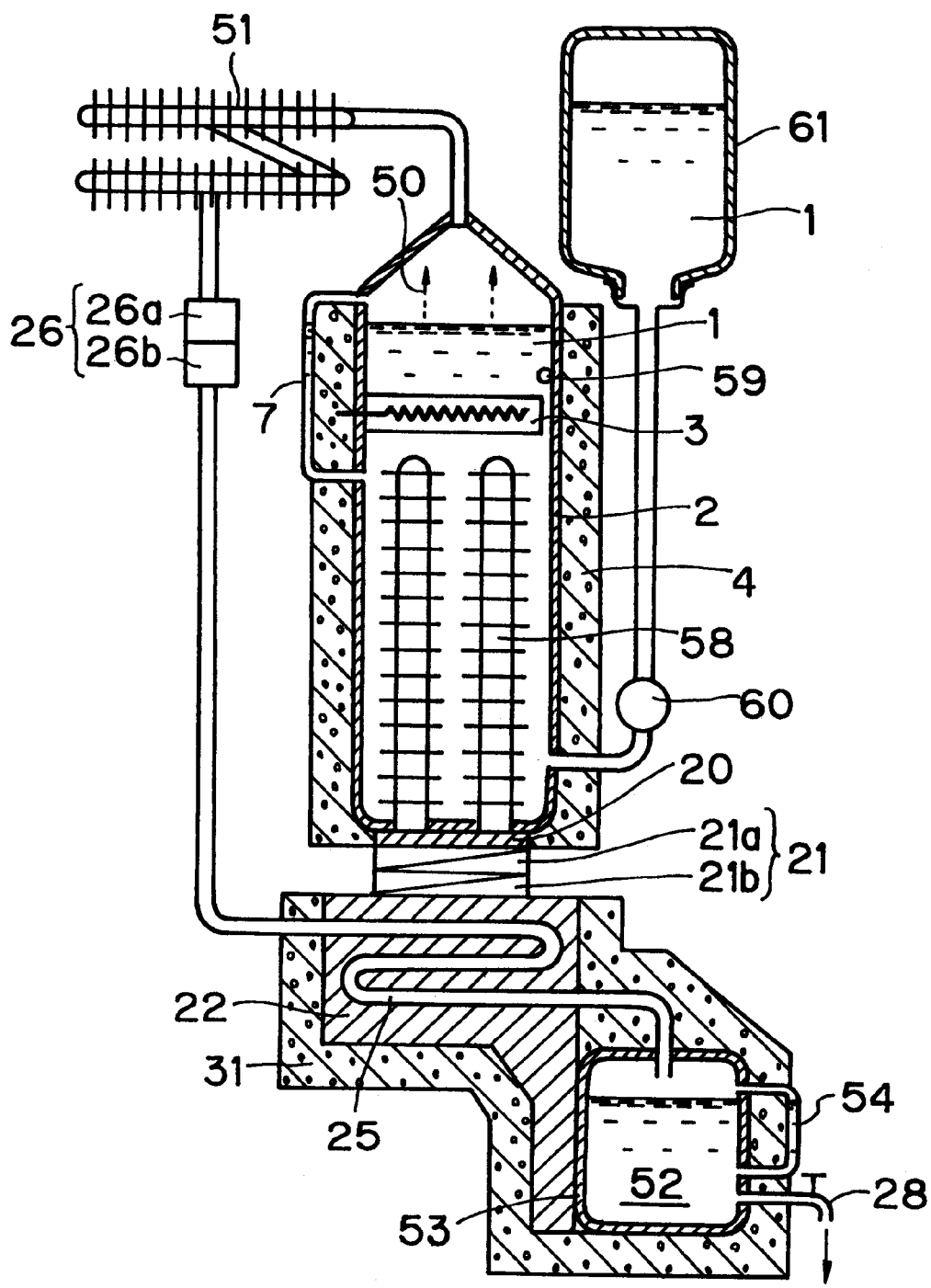
FIG. 8 is a schematic cross-sectional view of a watercooler according to a sixth embodiment of the present invention.
Figure 9:
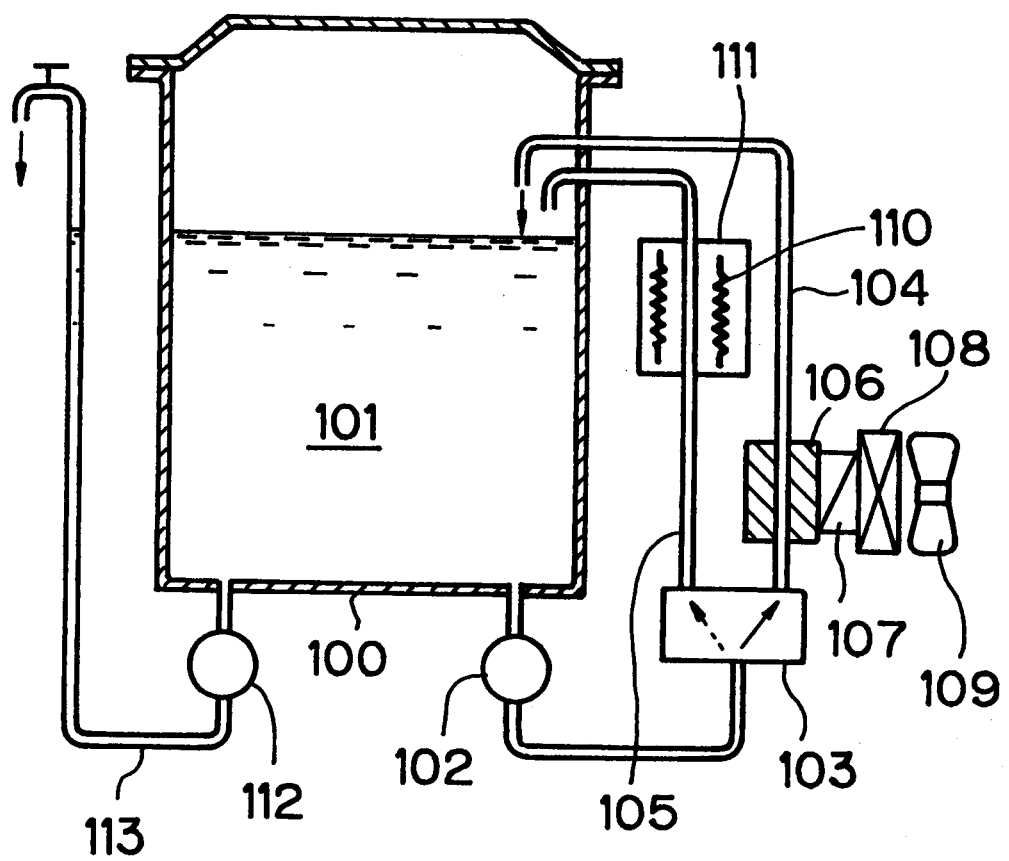
FIG. 9 is a schematic cross-sectional view of a conventional watercooler.

Reference is next had to FIG. 8, where the distillation-type watercooler according to the sixth embodiment of the present invention is illustrated. One or plural heat pipes 58 are arranged upright on a bottom part of the pot 2, and a heater 3 is disposed above the heat pipes 58. The level of water 1 inside the pot 2 is monitored by a water level sensor 59 so that it always remains higher than the heater 3. When the water level descends to the level of the sensor 59 due to evaporation of the water 1, an automatic valve 60 is opened based on a detection signal from the water level sensor 59, whereby water 1 inside a water-replenishing bottle 61 is replenished in a predetermined amount to the pot 2.

When the water 1 is heated by the heater 3 and is eventually brought into a boiling state, water vapor 50 so produced is guided to a condenser pipe 51. The condenser pipe 51 is composed of heat exchanger tubes wound vortically and connected together in plural stages, is provided with a number of fins, and is of the air-cooled type. Although no fan is used in this embodiment, it is possible to more promptly cool and condense water vapor by using a fan.

A filter 26, through which condensed water is caused to pass, is composed of an upstream-side layer 26a, which is packed with antibacterial activated carbon, hollow fibers, Bakuhanseki or the like, and a downstream-side layer 26b packed with Bakuhanseki, corallite or the like.

Water, which has passed through the filter 26, is cooled while it flows through the cold water pipe 25 maintained in a cold reserving state in advance, and is then stored as cold water 52 in a cold water reservoir 53. A part of the heat-absorbing-side thermal conductor 22 extends to a side of the cold water reservoir 53, and serves to fix the cold water reservoir 53 and also to keep it cold.

A thermoelectric module 21 arranged in close contact with the heat-absorbing-side thermal conductor 22 is in a cascade form. In this embodiment, it is composed of a first thermoelectric module 21a, which is in close contact with a heat-dissipating-side thermal conductor 20, and a second thermoelectric module 21b which is in close contact with the heat-absorbing-side thermal conductor 22. The first thermoelectric module 21a and the second thermoelectric module 21b are not connected in series so that their current values can be controlled separately.

To obtain cold water 52 of about 10° C. or so, for example, the values of currents to the first thermoelectric module 21a and the second thermoelectric module 21b are set so that a temperature difference of 40° C. or so is obtained between the individual modules 21a,21b (incidentally, the sizes and numbers of semiconductor chips used in the modules 21a,21b in this embodiment are the same).

This makes it possible to obtain about 90° C. as the temperature of the heat-dissipating-side thermal conductor 20. Since evaporating parts (lower parts) of the heat pipes 58 are in close contact with the heat-dissipating-side thermal conductor 20, a working medium (which may be formed of a volatile liquid such as an alcohol) inside the heat pipes 58 evaporates owing to the above-mentioned high temperature (about 90° C.), the resulting vapor ascends to the condensing parts (upper parts) of the heat pipes 58 and is then cooled and condensed as a result of a heat exchange with the surrounding water 1. Under a capillary action through a wick arranged on an inner wall of the heat pipe 58, or along the inner wall of the heat pipe 58, the thus-condensed liquid moves to the evaporating parts located in the lower parts. By repeating such evaporation and condensation of the working medium, the heat of the heat-dissipating-side thermal conductor 20 is promptly transferred to the water 1 via the heat pipe 58.

As the water in the pot 2 can be heated by making use of the heat acquired by the cooling unit, the evaporation of water 1 is promoted, making a contribution to the saving of energy. Use of these heat pipes can also be applied to the above-mentioned boiling-type watercooler.

Figure 10:
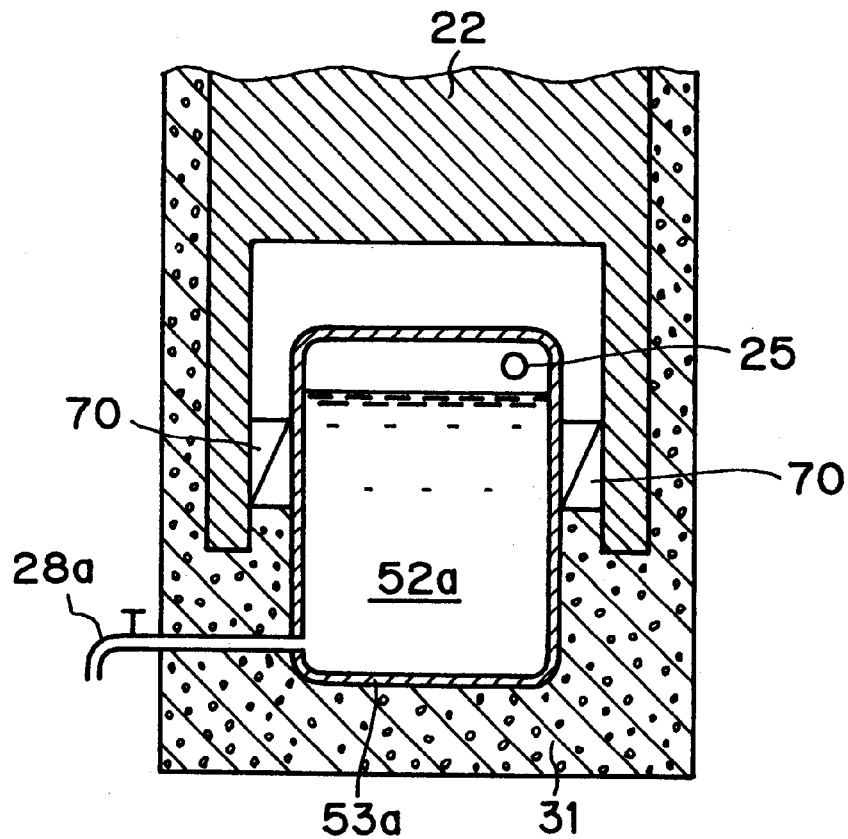
FIG. 10 is a fragmentary cross-sectional view of a water temperature controller in a watercooler according to a seventh embodiment of the present invention.

Referring now to FIG. 10, the watercooler according to the seventh embodiment of the present invention will be described. Major differences of this watercooler from the watercooler shown in FIG. 7 reside in that cold water prepared by a heat-absorbing-side thermal conductor 22 is stored in a reservoir 53a through a cold water pipe 25 and a temperature-controlling thermoelectric module 70 capable of externally setting the temperature of the reserved water 52a at a desired temperature is arranged between the heat-absorbing-side thermal conductor 22 and the reservoir 53a.

Accordingly, the cold water prepared by the heat-absorbing-side thermal conductor 22 can be chilled further, maintained at the same temperature or heated by the temperature-controlling thermoelectric module 70. The water the temperature of which has been controlled to a desired temperature as described above is then obtained through a faucet 28a.

Incidentally, a heater can also be used for heating the reserved water 52a.

Figure 11:
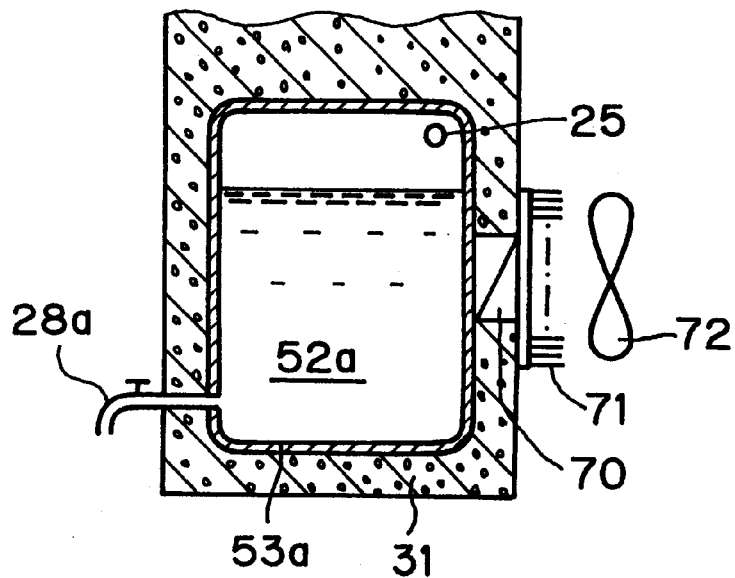
FIG. 11 is a fragmentary cross-sectional view of a water temperature controller in a watercooler according to an eighth embodiment of the present invention.

The watercooler according to the eighth embodiment of the present invention will next be described with reference to FIG. 11. Major differences of this watercooler from the watercooler shown in FIG. 10 reside in that a reservoir 53a is isolated and independent from an heat-absorbing-side thermal conductor 22, is surrounded by a heat-insulating layer 31, and a temperature-controlling thermoelectric module 70 attached on an outer surface of the reservoir 53a is provided with fins 71 and a fan 72.

In each of the above-described fourth to eighth embodiments, the air-cooling unit is used to condense water vapor. A water-cooling unit or a cooling unit making use of latent heat of evaporation can also be used. In each of the above-described embodiments, antibacterial materials or antibacterially-treated materials can also be used for the water-containing vessel, the cold reserving layer, the condenser, the cold water reservoir, and the various pipings.

In the invention according to the first aspect of this invention as described in claim 1, the water in the vessel is boiled at a stretch without recirculating it. Boiled water can therefore be obtained efficiently. Further, a portion of boiled water is taken out and is then chilled directly into cold water by the cooling unit. Boiled water the temperature of which is to be lowered is small in amount, thereby making it possible to promptly obtain cold water.

Boiled water is lowered in temperature by the primary cooling unit, and is then chilled to an appropriate temperature by the secondary cooling unit making use of the thermoelectric module. Thermal damages to the thermoelectric module can therefore be reduced, thereby making it possible to substantially extending the service life of the thermoelectric module, that is, the watercooler.

According to the invention as described in claim 2, dissipation of heat from the primary cooling unit and the secondary cooling unit is performed by commonly using only one fan. This makes it possible to provide the watercooler with a simpler structure and a smaller size.

According to the invention as described in claim 3, the cold reserving layer which has been maintained in a low-temperature state in advance is arranged on the heat-absorbing side of the secondary cooling unit and the water cooled by the primary cooling unit is caused to pass through the cold reserving layer. Even when a great deal of water is caused to flow, it can be converted into cold water in a short time.

According to the invention as described in claim 4, the cold reserving layer is composed of the metal block arranged in the secondary cooling unit. The cold reserving layer therefore has a large thermal capacity and has a high water cooling efficiency.

In the invention according to the second aspect of this invention as described in claim 5, condensed water which has been subjected to primary cooling and has been lowered in temperature in the condenser unit is obtained. It is then cooled to an appropriate temperature by the cooling unit making use of the thermoelectric module. Thermal damages to the thermoelectric module are therefore reduced, thereby making it possible to substantially extend the service life of the thermoelectric module, that is, the watercooler.

According to the invention as described in claim 6, dissipation of heat from the condenser unit and the cooling unit is performed by commonly using only one fan. This makes it possible to provide the watercooler with a simpler structure and a smaller size.

According to the invention as described in claim 7, the cold reserving layer which has been maintained in a low-temperature state in advance is arranged on the heat-absorbing side of the cooling unit and the condensed water is caused to pass through the cold reserving layer. Even when a great deal of water is caused to flow, it can be converted into cold water in a short time.

According to the invention as described in claim 8, the cold reserving layer is composed of the metal block arranged in the cooling unit. The cold reserving layer therefore has a large thermal capacity and has a high water cooling efficiency.

According to the invention as described in claim 9, a heat pipe is arranged upright on the bottom part of the vessel, and an evaporating part of the heat pipe is in close contact with the heat-dissipating-side of the cooling unit. Water can therefore be heated by using heat absorbed in the cooling unit, thereby contributing to energy saving.

According to the invention as described in claim 10, thermoelectric modules are arranged in plural layers in the cooling unit, and the values of electric currents to the thermoelectric modules in the individual layers can be controlled separately. This makes it possible to maintain the efficiency of each thermoelectric module at a high level.

According to the invention as described in claim 11, the cold water reservoir is arranged for storing cold water prepared by the cooling unit, and a part of the heat-absorbing-side thermal conductor of the cooling unit is in contact with the cold water reservoir. The cold reserving state for the cold water reservoir can be maintained well.

According to the invention as described in claim 12, there is a convenience that water of a preferred temperature can be obtained by further cooling cold water prepared by the cooling unit, maintaining the cold water at the same temperature or heating the cold water.

What is claimed is:

1. A watercooler comprising:
    a vessel for storing water therein;
    a heater for boiling said water in said vessel;
    a pump for lifting said boiled water;
    a primary cooling unit for subjecting said boiled water, which has been lifted by said pump, to primary cooling;
    a secondary cooling unit for subjecting said water, which has been subjected to said primary cooling, to secondary cooling by using a thermoelectric module, whereby cold water is obtained; and
    a service unit for dispensing said cold water subsequent to said secondary cooling.

2. A watercooler according to claim 1, further comprising:
    a single fan arranged commonly for said primary cooling unit and said secondary cooling unit to promote dissipation of heat therefrom.

3. A watercooler according to claim 1, further comprising:
    a cold preserving layer arranged on a heat-absorbing side of said secondary cooling unit and maintained beforehand in a low-temperature state, wherein said water, which has been subjected to said primary cooling, is caused to pass through said cold reserving layer.

4. A watercooler according to claim 3, wherein said cold preserving layer is a metal block arranged in said secondary cooling unit.

5. A watercooler comprising:
    a vessel for storing water therein;
    a heater for boiling said water in said vessel;
    a condenser unit for condensing water vapor produced by said boiling;
    a cooling unit for chilling condensed water, which has been obtained from said condenser unit, into cold water by using a thermoelectric module;
    a service unit for dispensing said cold water obtained by said cooling unit;
    a cold water reservoir for receiving cold water from said cooling unit and storing therein cold water prepared by said cooling unit; and
    a unit for setting said water stored in said reservoir at a desired temperature.

6. A watercooler comprising:
    a vessel for storing water therein;
    a heater for boiling said water in said vessel;
    a condenser unit for condensing water vapor produced by said boiling;
    a cooling unit for chilling condensed water, which has been obtained from said condenser unit, into cold water by using a thermoelectric module;
    a service unit for dispensing said cold water obtained by said cooling unit; and a single fan arranged commonly for said condenser unit and said cooling unit to promote dissipation of heat therefrom.

7. A watercooler comprising:

a vessel for storing water therein;

a heater for boiling said water in said vessel;

a condenser unit for condensing water vapor produced by said boiling;

a cooling unit for chilling condensed water, which has been obtained from said condenser unit, into cold water by using a thermoelectric module;

a service unit for dispensing said cold water obtained by said cooling unit; and a cold preserving layer arranged on a heat-absorbing side of said cooling unit and maintained beforehand in a low-temperature state, wherein said condensed water is caused to pass through said cold preserving layer.

8. A watercooler according to claim 7, wherein said cold preserving layer is a metal block arranged in said cooling unit.

9. A watercooler comprising:

a vessel for storing water therein;

a heater for boiling said water in said vessel;

a condenser unit for condensing water vapor produced by said boiling:

a cooling unit for chilling condensed water, which has been obtained from said condenser unit, into cold water by using a thermoelectric module;

a service unit for dispensing said cold water obtained by said cooling unit;

a heat pipe arranged upright on a bottom part of said vessel, and a heater arranged above said heat pipe;

wherein a working fluid evaporating part of said heat pipe is located in close contact with a heat-dissipating side of said cooling unit.

10. A watercooler according to claim 9, wherein as said thermoelectric module of said cooling unit, thermoelectric modules are arranged one over the other in the form of plural layers and values of electric currents to said thermoelectric modules in said respective layers are controllable separately.

11. A watercooler comprising:

a vessel for storing water therein;

a heater for boiling said water in said vessel;

a condenser unit for condensing water vapor produced by said boiling;

a cooling unit for chilling condensed water, which has been obtained from said condenser unit, into cold water by using a thermoelectric module;

a service unit for dispensing said cold water obtained by said cooling unit; and a cold water reservoir for storing therein cold water prepared by said cooling unit, wherein a part of a heat-absorbing-side thermal conductor of said cooling unit is in contact with said cold water reservoir.

12. A watercooler according to claim 1, further comprising:

a cold water reservoir for storing therein cold water prepared by said cooling unit; and a unit for setting said water stored in said reservoir at a desired temperature.

\* \* \* \* \*